Sept. 18, 1945.    C. R. HANNA ET AL    2,385,203
ELECTRIC TURRET TRAVERSE
Filed Sept. 27, 1941    3 Sheets-Sheet 1

WITNESSES:
E. F. Obesheim.

INVENTORS
Clinton R. Hanna, Stanley J. Mikina &
Lawrence B. Lynn.
BY
ATTORNEY

Sept. 18, 1945.   C. R. HANNA ET AL   2,385,203
ELECTRIC TURRET TRAVERSE
Filed Sept. 27, 1941   3 Sheets-Sheet 2
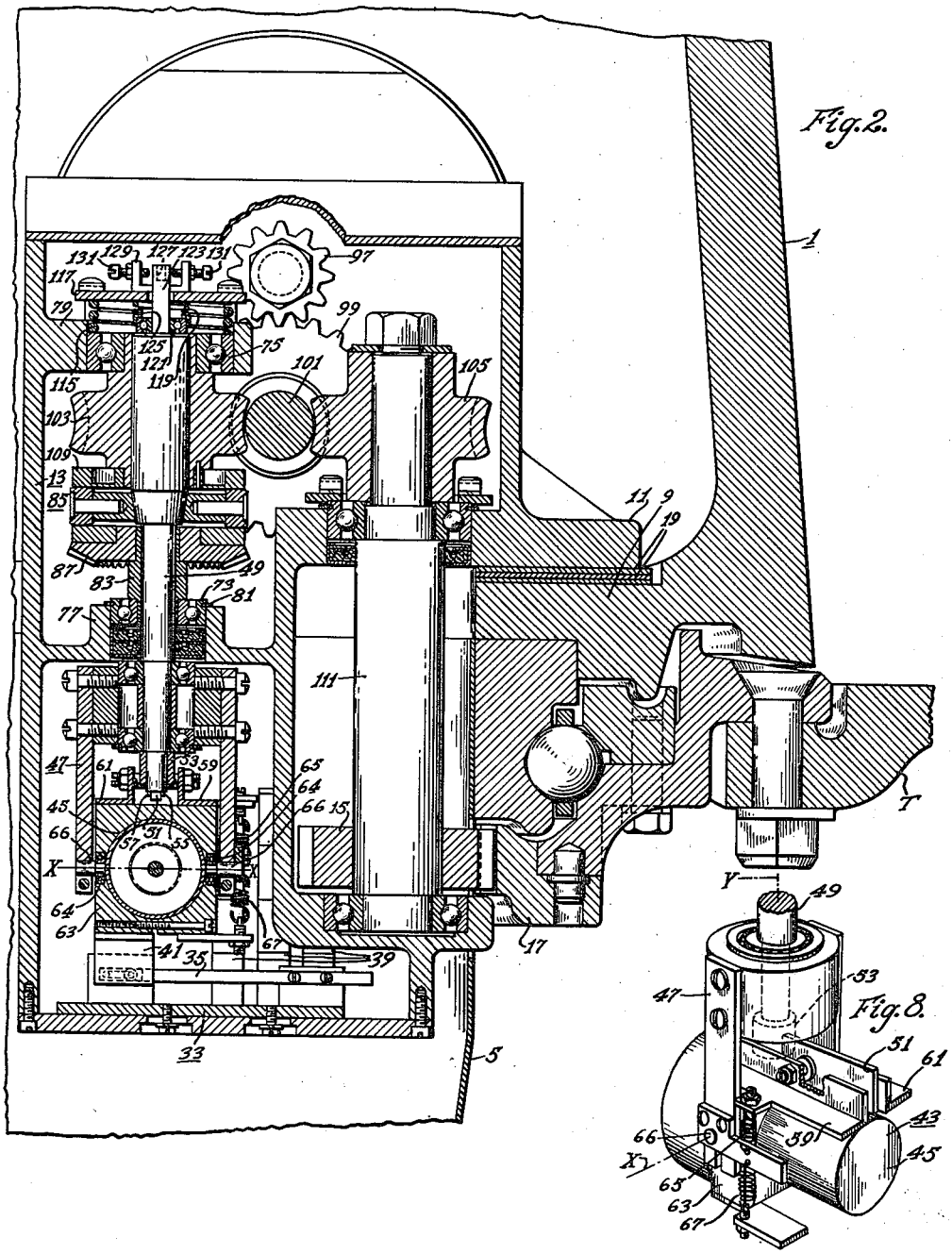

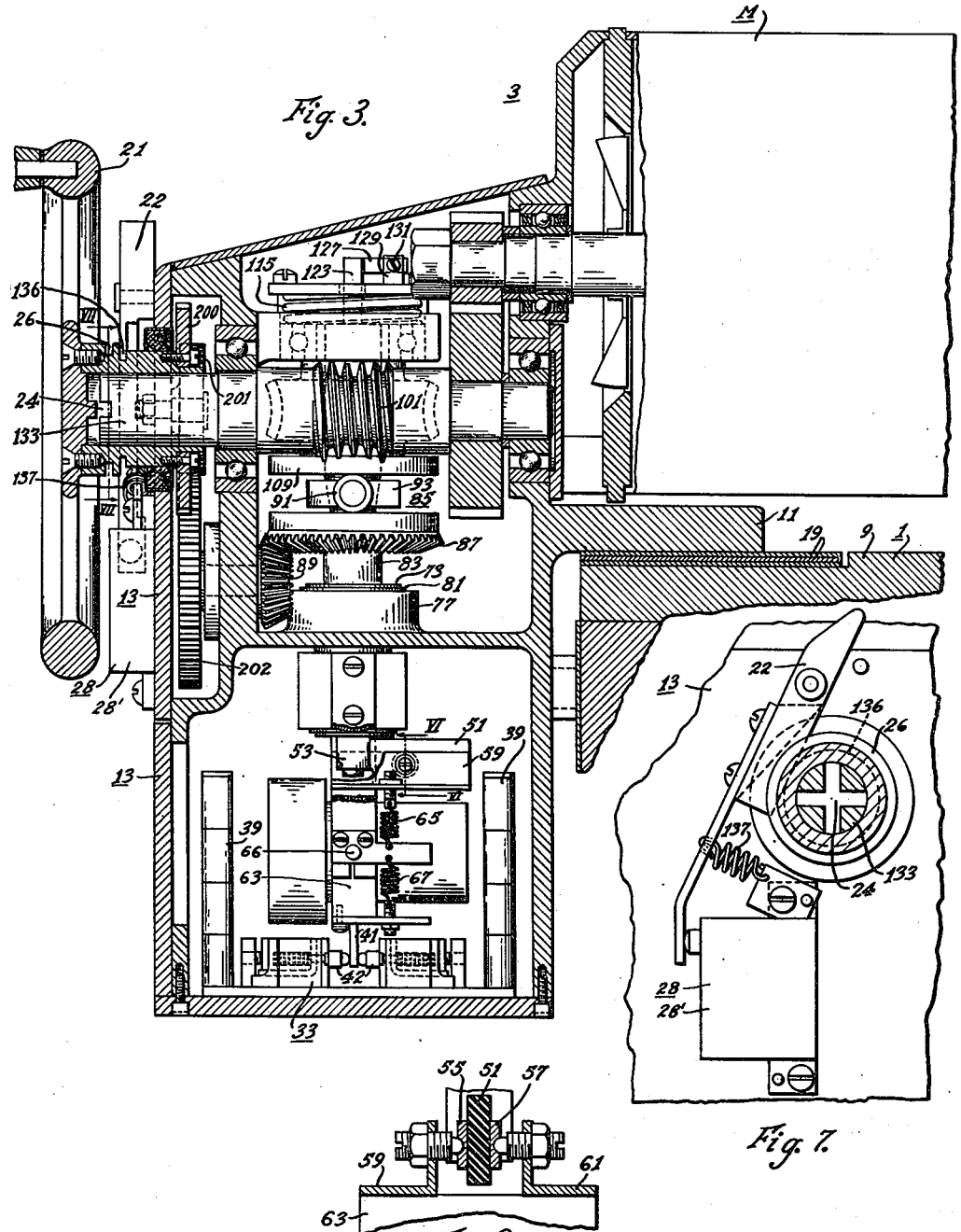

Patented Sept. 18, 1945

2,385,203

UNITED STATES PATENT OFFICE 2,385,203

ELECTRIC TURRET TRAVERSE

Clinton R. Hanna, Pittsburgh, and Stanley J. Mikina and Lawrence B. Lynn, Wilkinsburg, Pa., assignors to Westinghouse Electric Corporation, East Pittsburgh, Pa., a corporation of Pennsylvania Application September 27, 1941, Serial No. 412,612

36 Claims. (Cl. 172—239)

Our invention relates to a position regulator, more specifically, to one including an anticipating gyro and a control system responsive to movements of the anticipating gyro to move an element to a predetermined but adjustable position.

While our invention as hereinafter described is specifically applied to turrets such as found on army tanks, it is of general application and may be used to position any follow-up element requiring either angular or rectilinear positioning movement.

Our invention is specifically adapted, for example, to position turrets on tanks, naval vessels or aircraft, for positioning in traverse large guns such as those used for coast defense and for positioning various types of follow-up devices where weight makes manual operation impractical and where speed and accuracy of positioning are required.

An object of our invention is to provide a follow-up system including a means for automatically moving an element to a predetermined but adjustable position.

A more specific object of our invention is to provide a frame structure, such as a tank turret, and a control system for automatically and adjustably positioning the turret.

A still more specific object of our invention is to provide a tank turret with an electric driving means responsive to an anticipating gyro, which, in turn, is controlled by a manually adjustable mechanism so that the turret will be moved by the electric driving means in response to and in proportion to controlled movement afforded by the manually adjustable mechanism and the anticipating gyro.

Another specific object of our invention is to provide a clutching means in the manually adjusted mechanism so that the turret may be moved either manually by direct mechanical coupling between the manually adjusted mechanism and the turret, or by electrical power when the manually adjusted mechanism is declutched from direct turret drive.

Another specific object of our invention is to provide a switch or electrical interlock for deenergizing the electrical power control circuit when the clutch is thrown for manual operation.

A still further specific object of our invention is to provide a larger reduction from handwheel revolutions to turret revolutions for manual operation than for power.

A still more specific object of our invention is to provide a tank turret and an electric driving means responsive to an anticipating gyro, which, in turn, is controlled by a manually adjustable mechanism in which there is arranged a clutch and an electric interlock so positioned and designed that clutch engagement for direct manual mechanical drive will deenergize the power control circuit through an electric interlock actuated by clutch movement, and conversely energize the circuit when the clutch is disengaged for power control of the turret; and to still further provide a larger reduction in the ratio of handwheel revolutions to turret revolution for manual operation than for power, and to provide a turret that shall move in response to and in proportion to controlled movements afforded by the manually adjusted handwheel mechanism for either manual or electrical power drive of the turret.

Further objects and advantages will become more apparent from a study of the following specification when considered in conjunction with the accompanying drawings, in which:

Fig. 2 is an enlarged sectional view taken along the line II—II of Fig. 1;

Fig. 3 is an enlarged sectional view on the line III—III of Fig. 1;

Fig. 6 is an enlarged sectional view of the friction damping means taken on the line VI—VI of Fig. 3.

Fig. 7 is an enlarged sectional view of the spring biased latch taken along line VII—VII of Fig. 3; and Fig. 8 is a perspective view of the anticipating gyro assembly.

In order that our invention may be more fully appreciated and understood, a brief description of tank turrets is given hereinafter. Turrets of the army tank type susceptible of control by our position regulator are generally of heavy cast steel construction and have a circular base. They are rotatably mounted and secured to the tank body or structure by means of a ball-bearing race of the same diameter as the turret base, the inner ring of which is rigidly secured to the tank turret while the outer ring is secured to the tank body, which construction permits complete freedom of turret rotation and at the same time securely locks the turret to the tank.

Guns of the type commonly used in tanks are mounted on trunnions in the forward wall of the turret, which trunnions constitute an axis in a horizontal plane and at right angles to the gun-barrel axis for elevation movements of the gun. It is, therefore, obvious that we have freedom of gun elevation within limits imposed by the tank structure, but no provision for traverse or azimuth movement. With this construction azimuth movement of the gun can be accomplished only by rotating the turret. Existing automatic control systems, while providing power means for turret movement, do not provide the fineness and sensitive responsiveness of control which our position regulator makes possible and which is absolutely necessary for accurate gun fire control.

Figure 1:
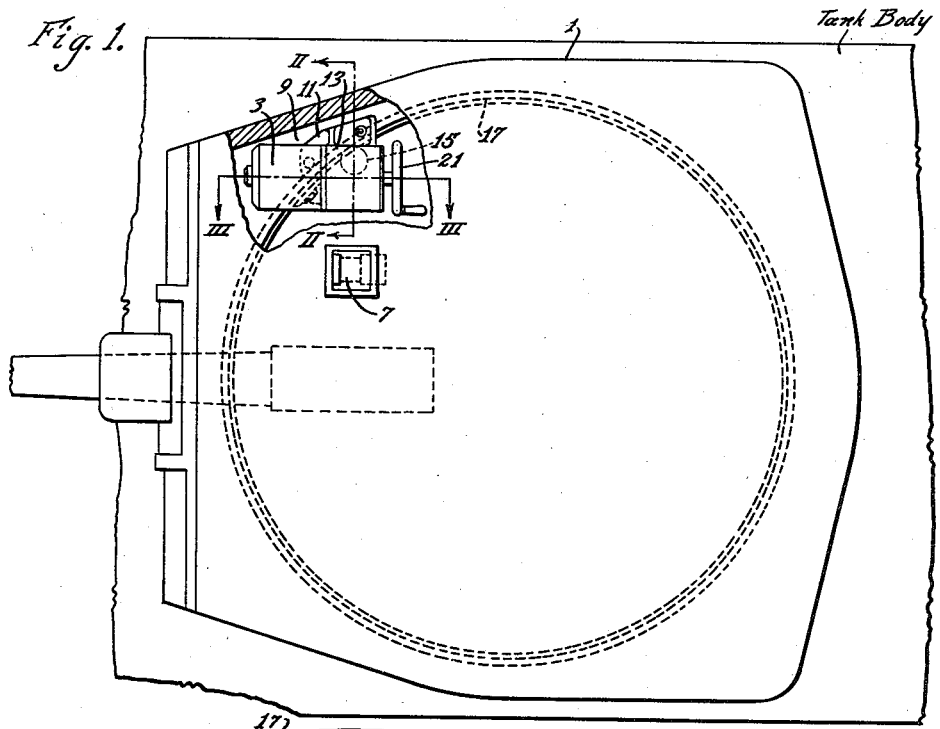
Figure 1 is a plan view of a tank turret partly broken away showing the location of a position regulator which embodies the principles of our invention.

Referring more particularly to Fig. 1, there is shown a plan view of a turret 1 mounted on a tank (shown broken away) with the top of the turret partly broken away to show the mounting of our position regulator (or turret traverse assembly), indicated generally by numeral 3. The operator stands substantially centrally in a basket 5, a fragmentary portion of which is shown in Fig. 2, between the gun and the turret traverse. A sighting device 7 of the periscopic type projects downwardly from the turret top to the eye level of the operator. With his right hand, the operator controls the turret traverse, and with his left hand controls the gun elevating means (not shown), while bringing the sight to bear on his target. Turret traverse to the left is ordinarily obtained by rotating the handwheel to the left, and right turret traverse requires handwheel rotation to the right. The turret traverse assembly 3 is securely bolted to an inwardly projecting flange 9 in the base of the turret by means of a bracket 11 integrally cast with housing 13 of the turret traverse assembly. Spur gear 15 is positioned to properly engage the internal stationary ring gear 17 (rigidly attached to the tank body) by means of proper selection of a number of shims 19, as shown in Figs. 2 and 3.

Figure 4:
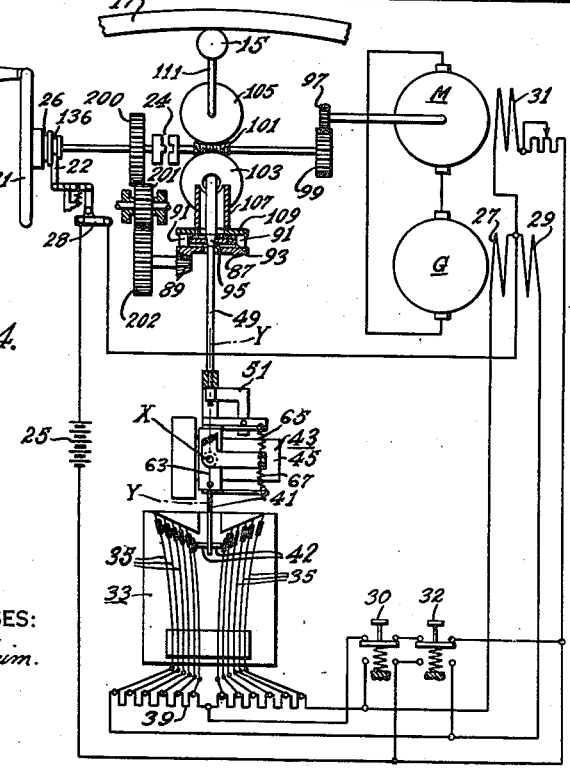
Fig. 4 is a schematic view of a position regulating system embodying the principles of our invention.

Fig. 4 shows in a schematic way the operation of the entire system. A current furnished by a battery 25 or other source of energy is normally equally divided between the field windings 27 and 29 of a variable voltage generator G, the polarities being opposite for the two directions of motor rotation. The motor M has a fixed field winding 31 and receives variable voltage for its armature from the generator, whose fields are controlled by the rheostats or resistance controlling devices denoted generally at 33. Each rheostat or resistance controlling device comprises a plurality of flexible metallic leaves 35 which carry at their extremities contact members 37, preferably made of silver, and the flexible metallic leaves are connected along spaced taps of a resistor 39. One method of operation of rheostats or resistance devices is to have a fixed resistance such as 39 in circuit with a coil or field winding and a rheostat or resistance device with some of the contacts in the normally closed position and the others in the normally open position on either the right or left hand portion of actuating element 41. I prefer to have at least one pair of contacts on each side of the actuating element 41 normally closed, or better still, about one-half the total number of contacts normally closed, so as to effect opening of contacts on one side while the other contacts are being closed, thus simultaneously modifying the amount of resistance in both the right and left-hand portions of resistor 39 or, in other words, obtaining a "push-pull" action. The rheostats or resistance devices are actuated by the gyro 43 which is responsive to the movements of cage member 93 of the differential 85.

For an understanding of the system shown in Fig. 4 a brief description is given hereafter. It will be followed further on in the specification by a detailed description of the function and construction of the various parts (see also Fig. 3). One (bevel gear) element 87 of the differential is turned by the handwheel 21 including spur gears 200, 201, 202 and bevel gear 89; the other element 109 is moved in proportion to turret movements through spur gear 15, worm wheel 105, worm 101 and gear 103, which assembly is, in turn, driven by the motor. The control shaft 49 moves angularly with the differential cage 93 except for extreme movements of the latter when slipping occurs at the conical friction clutch 95. Rotation of the handwheel 21 through spur gear train 200—201—202 and bevel gear 89 rotates the element 87 of differential 85. Since at this instant the element 109 of the differential is stationary, the differential is in an unbalanced condition, and cage member 93 will rotate by virtue of rolling contact of rollers 91 with elements 109 and 87. This rotation, being transmitted to shaft 49 through the conical friction clutch 95 displaces the gyro angularly about its vertical axis $y$, causing the gyro 43 to precess about its horizontal axis $x$, against the restraint of springs 65 and 67, which precessional movement through actuating element 41 deflects the leaf spring contacts, increasing the resistance in one side of the resistor 39 while decreasing it in the other, and thereby unbalancing the generator field windings 27 and 29. Alternatively, full energization of field winding 27 or 29 may be effected by depressing push-button 30 or 32, respectively, for effecting rapid turret movements. The motor will rotate in the direction as indicated by the more highly energized field and in proportion to the amount of the unbalance between the fields. Motor M drives worm 101 through driving pinion 97 and driven gear 89, rotating worm wheel 105, shaft 111 and pinion 15, which engages the internal stationary ring gear 17 rigidly mounted to the tank body, to move the turret with respect to the tank body in proportion to the movement of the handwheel 21. For manual operation, the latch member 22 is removed from the groove 136 against the biasing action of spring 137 allowing the handwheel to be pushed in, engaging the clutch 24 (comprising a male and a female portion) and bringing the handwheel in direct drive relationship with worm 101. The latch 22 upon being released engages a groove 26 of larger diameter than the former, locking the handwheel in direct drive position and maintaining the switch 28 (preferably a Microswitch contained in casing 28') open, de-energizing the power control circuit.

The anticipating gyro 43, so-called because it is responsive to the angular velocity of the differential or control shaft 49, is driven by a motor enclosed in the housing 45 which is clamped in the square block 63 (see Fig. 2) pivotally supported on pins 66, which are clamped in the ends of forked member 47 and which project inwardly to engage ball bearings mounted in counterbores in the block 63. Forked member 47 floats circumferentially on ball bearings on differential or control shaft 49. The fork and gyro are rotated by the arm 51 which extends radially with respect to the control shaft 49 and is rigidly secured by means of a collar 53 to the lower end of the latter. Friction shoes 55 and 57 (see Figs. 6 and 8) mounted on angle pieces 59 and 61 projecting from the gyro clamping block or frame 63 cooperate with the arm 51 to provide a torque-transmitting connection between the control shaft and the gyro, the engaging surfaces of the arm and the shoes being so arranged as to provide for precessional movement of the gyro about the $x$ axis.

As unbalanced differential movements rotate shaft 49, the whole gyro assembly rotates about a vertical axis, which is the axis of shaft 49, causing the gyro to precess about its horizontal axis $x$, or bearing axis, against the stiff restraining springs 65 and 67, and it is necessary to damp this latter movement. The restraining springs 65 and 67 provide a positive return of the anticipating gyro 43 to its normal position and have sufficient stiffness to prevent the gyro from responding to vibrations or disturbances of frequencies in a vertical plane such as caused by pitching movements of the tank and in addition to limit the precession to an angle which is a workable one with the specific resistance device and system as a whole. In other words the precession angle is reduced to an optimum value so that for maximum velocity of movement of handwheel 21, a maximum or slightly less than maximum precessional movement of the gyro will take place.

The sole purpose of mounting forked member 47 in bearings on shaft 49 is to provide freedom of rotation of the gyro assembly about its vertical or $y$ axis so it may transmit reaction torques as developed during precessional movements of the gyro to arm 51 through angle pieces 59 and 61 and friction shoes 55 and 57. The shoes are adjusted to allow clearance of arm 51 between their faces; while there is slight lost motion between the shoes 55 and 57 and the arm 51, it is of such a small quantity that it in no way affects the stimulus of actuating element 41. That is, for maximum speed of movement of the handwheel as caused by the average operator, the precession will be substantially the maximum permissible value.

The purpose of the gyro is to produce deflections of the resistor leaf spring contacts proportional to differential output velocities. Any movement of the gyro about its vertical or $y$ axis causes the gyro to precess about its horizontal or $x$ axis against the stiff restraining springs 65 and 67. The torque about the horizontal axis is proportional to the angular velocity about the vertical axis and deflects the restraining springs 65 and 67 a proportional amount. Velocities about the horizontal axis produce a reaction torque about the vertical axis, and the arm 51 and friction shoes 55 and 57 transmit this torque.

But during precession about the horizontal axis, the friction shoes slide with respect to arm 51, the friction being proportional to the applied torque, which, in turn, is proportional to the precessional velocity about the horizontal axis. The damping thus obtained may be adjusted to the desired value by varying the radius at which the friction forces act with respect to torque, by varying the radius at which the friction forces act with respect to precession and by choosing friction shoe material having the proper coefficient of friction. Such friction damping means constitutes an improvement over the equivalent hydraulic damping means described in the copending applications of C. R. Hanna, Serial No. 366,877, entitled Gun stabilizers, filed November 23, 1940, and of L. B. Lynn, Serial No. 366,918 entitled Gun stabilizers, inasmuch as the hydraulic damper has the disadvantage of changing its viscosity with temperature change and is somewhat more complicated in design and is less easy to adjust.

Figure 5:
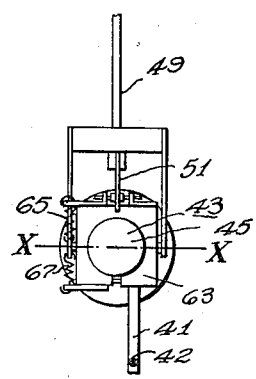
Fig. 5 is a rear view of the anticipating gyro shown in Fig. 4.

From the foregoing description, it is evident that a completely stabilized gyro reaction to differential movements is obtained, but yet is so sensitive as to react in proportion to the smallest angular deflections and velocity of the control shaft 49, thus providing a high degree of accuracy of turret control. Actuating element 41 is disposed to one side of the axis of control shaft 49, as shown in Figs. 2 and 5, so that deflections of the resistor leaf spring contacts also occur in proportion to the angular position of shaft 49. This is the position regulating stimulus. There are also contact deflections proportional to angular velocity of control shaft 49, as transmitted by actuating element 41 due to the precessional angle of the gyro, in addition to the above mentioned contact deflections proportional to the angular positioning of shaft 49, and the summation of these deflections puts into the electrical system impulses which are proportional to the angular velocity and angular position of differential shaft 49.

In Figs. 2 and 3, we have shown the mechanical details of the construction of our invention. Reference numerals which refer to the same parts are identical in Figs. 2, 3 and 4. In schematic Fig. 4, the housing 13 of the turret traverse has been omitted for the purpose of simplicity. As may be seen, however, from Figs. 2 and 3, our inventive position regulator is a complete and compact unit and moves with the turret which it drives. The shaft 49 is rotatably and slidably supported in a vertical position by means of ball bearings 73 and 75 in bearing housings 77 and 79 cast as an integral part of the turret traverse housing 13. The lower ball bearing 73 has turned in its outer race an annular groove, into which is inserted a ring 81 which engages the upper surface of housing 77 and supports the bearing 73 in the position shown. A sleeve 83 of inside diameter to clear control shaft 49 has reduced outside end diameters, one of which fits snugly within the inner race of ball bearing 73, and the other within the bevel gear 87 of differential 85, thus restraining the differential member 87 vertically and at the same time providing freedom of rotation about shaft 49. Differential cage 93 is positioned within the two sides of the differential. Smooth rollers 91 rotatably fastened to the cage in a diametrically opposite relation are frictionally engaged by the two sides of the differential 87 and 109. A worm wheel 103 is rotatably and slidably mounted on shaft 49.

The end portions of its hub are reduced in diameter, at its bottom end to have pressed and pinned in position the upper side 109 of the differential 85, and at its upper end to receive the inner race of ball bearing assembly 75. The spring 115 is of such a diameter as to seat itself upon the outer race of bearing assembly 75 and is retained in a compressed position by a plate 117, which is securely bolted to radially extending portions of bearing housing 79.

Forces from the spring 115 are transmitted through the bearing assembly 75, and the worm 103 to the upper element 109 of the differential, thus assuring engagement of the two elements of the differential with the rollers 91. A second spring 119 encircles a reduced portion 123 of shaft 49. Its lower end is seated by means of a sleeve 125 of substantially Z-shaped cross-section to the outer race of a bearing assembly 121 on the reduced portion 123 of shaft 49. The spring 119 is also retained in a compressed position by plate 117, and transmits its force through the bearing assembly 121 to the control shaft 49, thereby assuring frictional engagement with the differential cage member 93 through the conical friction clutch 95. The reduced portion 123 of shaft 49 extends upwardly through a hole in plate 117 and has rigidly mounted at its end a radially projecting arm 127. A U-shaped bracket 129 fastened to plate 117 has in its upper ends inwardly projecting set screws 131, between which is positioned the free end of radial arm 127, thus limiting the angle through which the control shaft 49 may be moved to avoid excessive or damaging deflections of the Silverstats 33, it being remembered that the differential cage 93 may slip with respect to the control shaft 49 due to the connection therebetween being in the form of a friction clutch 95.

The handwheel 21 is slidably and rotatably mounted about the worm shaft 133 by means of a sleeve 135 (Fig. 3) to one end of which the handwheel is fixed. To the other end is fastened the driving gear 200 of the spur gear train. Ball bearings have been used throughout in order to reduce the driving forces and at such points as the horizontal axis of the gyro in order to reduce as far as possible errors resulting from friction otherwise introduced into the system.

From the foregoing, it will be apparent that the follow-up member or turret may be moved angularly either manually or by power means depending upon the axial position of the pilot member or hand wheel 21. Incident to movement of the hand wheel to its innermost axial position, the clutch is connected and the input of energy medium to the power means is interrupted, and, with the hand wheel in that position, it may be turned to effect manual actuation of the follow-up member or turret. With the hand wheel or pilot member in its outermost position, turning thereof introduces a deviation in angular speed and position of the hand wheel in relation to the angular speed and position of the connected turret and motor, and this deviation is converted, through the action of the differential, at 85, into an angular displacement of the control shaft 49 which results in actuation of the gyro, at 43, and the contacts, at 33, to compensate for the deviation by restoring the angular speed and position relation of the connected motor and turret and of the hand wheel. Both position and velocity of the control shaft 49 influence contact operation. Lateral location of the actuator 41 with respect to the axis of the shaft 49 makes position a factor, and velocity is a factor because, with the stiff restraining springs, the precessional deflection of the gyro is proportional to the angular velocity of the control shaft, damping being effected by friction members arranged so that forces proportional to precessional velocity are obtained to avoid variable damping performance, the friction being proportional to the applied torque which is proportional to the precessional velocity.

We are, of course, aware that others, particularly after having had the benefit of the teachings of our invention, may devise other devices embodying our invention, and we, therefore, do not wish to be limited to the specific showings made in the drawings and the descriptive disclosure hereinbefore made, but wish to be limited only by the scope of the appended claims and such prior art as may be pertinent.

We claim as our invention:

1. A position regulator comprising, in combination, a rotatable pilot member, a rotatable follow-up member, electrical regulator means including a reversible electric motor and a variable voltage energizing system therefor, said voltage being controllable in amount and direction in accordance with the amount and direction of movement of said pilot member, gear means for mechanically coupling said motor to said follow-up member, a second means including a clutch for selectively effecting direct manual drive between said pilot member and said follow-up member, and electrical switching means operable upon engagement of said clutch for rendering said variable voltage energizing system ineffective and operable upon disengagement of said clutch for rendering said system effective.

2. A position regulator as set forth in claim 1 in which said pilot member comprises a rotatable hand wheel, latch means for adjustably mounting said hand wheel in either of two positions in an axial direction, said clutch being engaged when said hand wheel is in one of said positions, thereby effecting direct manual drive between said hand wheel and follow-up member and disengaged when said hand wheel is in the other of said positions so as to permit power drive of said follow-up member by said motor.

3. A follow-up control system comprising, in combination, a manually rotatable pilot member, a rotatable follow-up member, an electrical regulating system including a reversible electric motor and a generator having windings of opposite polarity, resistance means in circuit with said windings, a gyro which is controllable by rotative movements of said pilot member for varying said resistance means and for varying the energization of said windings and the resultant polarity thereof so as to rotate said motor in either of two directions by an amount proportional to the movement of said pilot member, and means including a switch in said variable voltage system and a clutch, both operable by axial movement of said pilot member to either of two fixed axial positions for effecting a direct manual drive of said follow-up member by said pilot member through said clutch and opening of said switch in one of said positions, and for effecting a drive from the motor to the follow-up member and disengagement of the clutch together with closing of said switch in the other of said positions.

4. A follow-up control system as recited in claim 3 in which said gyro includes an actuating member which is so mounted as to vary said resistance means in response to the velocity of rotation as well as the amount of rotation of said pilot member.

5. A follow-up control system as recited in claim 3 in which said gyro is rotatably driven by said pilot member and has an off-center actuating arm for varying said resistance means in accordance with the amount of rotation of said pilot member, said gyro having movement about its precession axis responsive to the velocity of rotation of said pilot member and which movement is imparted to said arm also to vary said resistance means.

6. In a follow-up control system as recited in claim 3 wherein said gyro is rotatably driven by said pilot member, has an off-center actuating arm for varying said resistance means in accordance with the amount of rotation of said pilot member, and has movement about its precession axis responsive to the velocity of rotation of said pilot member and which movement is imparted to said arm also to vary said resistance means, friction-damping means effective about the precession axis of said gyro, and spring means for opposing movements of the gyro from a center position about the precession axis.

7. In a follow-up control system as recited in claim 3 wherein said gyro is rotatably driven by said pilot member, has an off-center actuating arm for varying said resistance means in accordance with the amount of rotation of said pilot member, and has movement about its precession axis responsive to the velocity of rotation of said pilot member and which movement is imparted to said arm also to vary said resistance means, friction-damping means effective about the precession axis of said gyro and comprising a driving arm responsive to movement of said pilot member, an element movable with the gyro about the precession axis and frictionally engaged with and rotated by said driving arm, and spring means for opposing movements of the gyro from a center position about the precession axis and having sufficient stiffness for maintaining said gyro unresponsive to vibrations or disturbances of low frequency and for limiting the precession movement to an optimum value.

8. In a follow-up control system as recited in claim 3 wherein said gyro is rotatably driven by said pilot member, has an off-center actuating arm for varying said resistance means in accordance with the amount of rotation of said pilot member, and has movement about its precession axis responsive to the velocity of rotation of said pilot member and which movement is imparted to said arm also to vary said resistance means, friction damping means effective about the precession axis of said gyro and comprising a driving arm responsive to movements of said pilot member and having friction surfaces, an element movable with the gyro about the precession axis and provided with friction shoes rigidly secured thereto and frictionally engageable with the surfaces of said driving arm to rotate the gyro, and spring means for biasing the gyro about the precession axis to a predetermined central normal position and having sufficient stiffness to make said gyro unresponsive to low frequency vibrations and for limiting the precession movement to an optimum value.

9. In a follow-up control system as recited in claim 3 wherein said gyro is rotatably driven by said pilot member, has an off-center actuating arm for varying said resistance means in accordance with the amount of rotation of said pilot member, and has movement about its precession axis responsive to the velocity of rotation of said pilot member and which movement is imparted to said arm also to vary said resistance means, friction damping means for damping movements of said gyro about the precession axis and comprising a driving arm responsive to movements of said pilot member and having friction surfaces at its extremity, an element movable with the gyro about the precession axis and provided with a pair of friction shoes rigidly secured thereto and engageable with said friction surfaces of the driving arm so as to effect rotation of the gyro assembly by rotation of said driving arm, the movements of said element and the gyro about the precession axis and the friction developed by said arm and the shoes being responsive to the velocity of rotation of said driving arm, and spring means for biasing said element and the gyro about the precession axis to a predetermined central normal position and having sufficient stiffness so as to make said gyro unresponsive to vibrations below those of a predetermined frequency and for limiting movement about the precession axis to an optimum value.

10. A follow-up control system comprising, in combination, a manually-operated rotary pilot member, a follow-up rotatable member, a reversible electric motor operatively connected to the follow-up member, variable means for controlling the input of electrical energy to the motor for operation of the latter over a speed range in opposite directions, differential means including a pair of input elements operatively connected to the pilot member and to the follow-up member and a rotary output element cooperating with the input elements, a gyro connected for movement by the output element with its spin axis extending transversely of the output element axis and with its precession axis normal both to the output element axis and to the spin axis so that angular velocity of the output element is accompanied by proportional torque of the gyro about the precession axis, and means for operating said variable means in response to such torque about the precession axis.

11. A position regulator comprising, in combination, manually-operable pilot means movable axially to first and second positions and having controlling movements in each position, a follow-up member, an electric motor, first drive means operatively connecting the motor and the follow-up member, means for controlling the input of electric energy to the motor for moving said follow-up member in agreement with movements of said pilot means in the first axial position thereof, second drive means for the follow-up member, first means responsive to axial movement of the pilot means from first to second position to render the second drive means effective for manual operation of the follow-up member by controlling movement of the pilot means in its second axial position and to movement of the pilot means from second to first positions to render the second drive means ineffective, and second means responsive to axial movement of said pilot means from first to second positions to interrupt the input of electric energy to the motor and to movement thereof from second to first positions to restore the input of such energy.

12. The combination as recited in claim 11 wherein the first responsive means is comprised by a clutch and the second responsive means is comprised by a switch in the motor circuit.

13. A follow-up control system comprising, in combination, a supporting structure, a rotatable follow-up member carried by the supporting structure, a gear concentric with the axis of the follow-up member and fixed to the supporting structure, a rotatable gear carried by the follow-up member and meshing with the fixed gear, a reversible electric motor carried by the follow-up member and operatively connected to the rotatable gear, a manually rotatable pilot member carried by the follow-up member, said pilot member being movable axially to either first or second positions, means responsive to rotative movement of the pilot member when the latter is in its first axial position for controlling the input of electric energy to the motor to effect rotation of the follow-up member proportional in amount and direction to rotation of the pilot member, means utilizing rotary movement of the pilot member when the latter is in its second axial position for effecting rotation of the follow-up member manually, and means responsive to axial movement of the pilot member from its first position to its second position to render said utilizing means effective and for interrupting the input of electrical energy to the motor and responsive to axial movement thereof from the second position to the first position to render the utilizing means ineffective and to establish input of electrical energy to said motor.

14. A follow-up control system comprising, in combination, a manually-rotatable pilot member; an annular follow-up member; a structure for supporting the follow-up member and having an opening into which the latter extends; means for connecting the follow-up member to the supporting structure and providing for angular movement thereof in said opening; a gear attached to the supporting structure and arranged coaxially of said follow-up member; a reversible electric motor mounted on said follow-up member; a pinion carried by the follow-up member, operatively connected to the motor, and meshing with the gear; a differential including opposed gears and a cage carrying planet gears engaging the latter; means operatively connecting one of said opposed gears for rotative movement with the motor and pinion; means operatively connecting the other of said opposed gears for rotative movement with the pilot member; a control shaft; means for connecting the control shaft for rotative movement with the cage; means including a movable member for controlling the input of electric energy to the motor; and means including a gyro which moves about its precession axis in response to angular velocity of the control shaft to move said movable member.

15. A follow-up control system as recited in claim 3 in which said gyro is rotatably driven by said pilot member and has movement about its precession axis in consequence thereof, together with spring means opposing movements of the gyro about the precession axis in either direction from a mean position and serving to restore it to that position and damping means effective on the gyro about the precession axis and operative to develop a damping effect dependent upon precessional velocity of the gyro.

16. A follow-up control system comprising, in combination, a movable pilot member, a follow-up member, a reversing motor for driving the follow-up member, means including a movable member for controlling the input of energy medium to the motor to operate the latter in opposite directions, a pair of elements movable with the pilot member and with the follow-up member, respectively, and having a normal relative positional relation, a gyro which moves about its precession axis in response to the velocity of deviation in said positional relation of said elements, and means responsive to movement of the gyro about its precession axis for moving the movable member of said control means.

17. The combination as recited in claim 16 with biasing means acting on the gyro about its precession axis in opposite directions with force which increases as movements about the precession axis in opposite directions increase and means providing damping dependent upon the velocity of the gyro about the precession axis and acting on the gyro about the precession axis.

18. A follow-up control system as recited in claim 10 wherein the pilot member has movement other than piloting movement, together with a clutch for operatively connecting the pilot member to the follow-up member for manual actuation of the latter, means responsive to said other movement of the pilot member in one direction to connect the clutch and vice versa, and means responsive to clutching movement of the pilot member for interrupting the input of electric energy to the motor and to disconnecting movement thereof for restoring such input.

19. A follow-up control system as recited in claim 10 wherein the pilot member comprises a hand wheel which is rotatable and is axially movable to first and second positions, together with means operative to hold the hand wheel in either first or second position, a clutch for operatively connecting the hand wheel to the follow-up member for manual actuation of the latter, means responsive to movement of the hand wheel from first position to second position to connect the clutch and responsive to movement from the second position to the first position to disconnect the clutch, and means responsive to movement of the hand wheel from said first position to the second position for interrupting the input of electric energy to the motor and to movement from the second position to the first position for restoring such input.

20. The follow-up system as recited in claim 10 wherein the pilot member has movement other than piloting movement and wherein the variable means includes an electric circuit for the motor and the differential means and the gyro are operative to control the variable means for motor operation in either direction with variation in voltage in either direction of operation, together with a switch for said circuit, a clutch for connecting the pilot member to the follow-up member for manual actuation of the latter, and means responsive to said other movement of the pilot member, in one direction, to open the switch and connect the clutch and, in the other direction, to close the switch and disconnect the clutch.

21. A follow-up control system comprising, in combination, a follow-up member movable in opposite directions; a pilot member movable in opposite directions to secure corresponding movements of the follow-up member; power means operable in either direction and operatively connected to the follow-up member for moving the latter; a differential comprising a pair of input elements and an angularly movable output element; means for operatively connecting the pilot member and the follow-up member to the respective input elements; means providing energy medium for the power means; a control member movable, from a mean position, in opposite directions to secure operation of the power means in opposite directions with the supply of energy medium thereto progressively increasing as the controlling member is moved away from mean position; a gyro connected to the output element of the differential with its spin axis extending transversely of the output member axis and with its precession axis normal both to the latter axis and the spin axis; centering spring means acting on the gyro about its precession axis; and means utilizing the gyro for connecting the control member in eccentric relation with respect to output member axis with the control member connected to a part of the gyro movable about the precession axis.

22. The combination as recited in claim 21, with means for confining angular movement of the output element of the differential transmitted to the gyro to a desired angle.

23. The combination as recited in claim 21, wherein the output element comprises first and second parts connected by slip clutch with the gyro connected to the second part.

24. The combination as claimed in claim 21, wherein the means connecting the gyro to the output element includes torque-transmitting members connected to the output element and to the gyro and having friction surfaces which are engageable to provide for damping about the precession axis.

25. A follow-up control system comprising, in combination, a movable follow-up member; a movable pilot member carried by the follow-up member; a reversible motor carried by the follow-up member; means utilizing rotation of the motor to move the follow-up member; a differential comprising a pair of angular motion input members and an angular motion output member; means for operatively connecting said utilizing means and the pilot member to the respective input members; a control shaft connected to the output member; means for controlling the input of energy medium to said motor and including a control member movable from an intermediate position in opposite directions for operation of the motor in opposite directions with the input of energy medium thereto progressively increasing as the control member is moved away from intermediate position; a yoke swiveled to said control shaft about the axis of the latter; a gyro rotor; a frame for the rotor; means for pivotally connecting the frame to the yoke about a precission axis which is normal both to the rotor spin axis and to the axis of the control shaft and the rotor spin axis extending transversely of the control shaft axis; torque-transmitting means between the control shaft and the gyro frame and including friction surfaces which are engageable to provide for damping about the precession axis; spring means connecting the yoke and the frame and effective to oppose movement of the latter in opposite directions about the precession axis; and means for connecting the gyro frame to said control member.

26. The combination as recited in claim 25 wherein the connection between the output member and the control shaft is a slip clutch with means for restricting the location and extent of angular motion of the control shaft suitably to the operating requirements of the energy medium controlling means.

27. The combination as claimed in claim 25 wherein the pilot member has movement other than the piloting movement and wherein the connection between the output member and the control shaft is a slip clutch together with means for restricting the location and extent of angular motion of the control shaft suitably to the operating requirements of the energy medium controlling means, a clutch for connecting said pilot member to said motion utilizing means for manual actuation of the follow-up member, a device operative to provide for or interrupt the supply of energy medium to said motor, and means responsive to said other movement of the pilot member, in one direction, to connect the clutch and operate said device to interrupt the input of energy medium and, in the other direction, to disconnect the clutch and operate said device to restore input of such energy medium.

28. A follow-up system comprising, in combination, a first rotary member; a second rotary member; an electric motor operatively connected to one of said members; means providing electric energy input for the motor and including a generator having field windings of opposite polarity; a pair of resistance elements included in the field winding circuits with a resistance element in each circuit; means including an actuator movable, in one direction, to progressively include portions of one resistance element in circuit and to progressively shunt portions of the other resistance element, and, in the other direction, to secure the reverse operation; a gyro having a precession axis; centering springs acting on the gyro about the precession axis; differential means responsive to relative angular deviation of said members for causing movement of the gyro about the precession axis; and means utilizing movement of the gyro about the precession axis to move said actuator.

29. A follow-up system comprising, in combination, a first rotary member; a second rotary member; an electric motor operatively connected to one of said members; means providing electric energy input for the motor and including a generator having field windings of opposite polarity; a pair of resistance elements included in the field winding circuits with a resistance element in each circuit; means including an actuator movable, in one direction, to progressively include portions of one resistance element in circuit and to progressively shunt portions of the other resistance element, and, in the other direction, to secure the reverse operation; a gyro having a precession axis; centering springs acting on the gyro about the precession axis; differential means responsive to angular deviation of said members for causing movement of the gyro about the precession axis; and means for connecting the actuator to the gyro so that its actuating portion is at one side of the spinning axis in order that resistance variation may be effected both in response to angular displacement and velocity thereof impressed on the gyro by the differential means.

30. A follow-up system comprising, in combination, a first rotary member; a second rotary member; an electric motor operatively connected to one of said members; means providing electric energy input for the motor and including a generator having field windings of opposite polarity; means for energizing said windings and including an actuator movable, in one direction, to increase the energization of one winding in relation to the other and, in the other direction, to secure the reverse operation; a gyro having a precession axis; differential means responsive to angular deviation of said members to apply angular motion to the gyro to cause the latter to develop torque about the precession axis proportional to the velocity of angular deviation; and means responsive to torque of the gyro about the precession axis for moving said actuator.

31. A follow-up system comprising, in combination, a first movable member, a second movable member, an electric motor positively geared to the second movable member, means providing electric energy input to the motor including a generator having a field and means including an actuator movable to progressively change the field strength, a differential including input members and an output member with the input members in positive geared relation with respect to said first movable member and said motor, respectively, a gyro having a precession axis, means utilizing the output member to apply angular motion to the gyro such that the velocity of such motion is accompanied by proportional torque of the gyro about the precession axis, and means responsive to torque of the gyro to move said actuator.

32. A follow-up system comprising, in combination, a first movable member, a second movable member, a motor, means for transmitting motion from the motor to said second member, means including a control member movable to control the energy input to the motor, a differential including a pair of input elements and an output element, means providing for the transmission of motion from the motor to one of the input elements with a fixed ratio, motion-transmitting means between the first movable member and the other input element and having a fixed ratio, a gyro having a precession axis, means responsive to motion of the output element to apply angular motion to the gyro such that the velocity of such motion is accompanied by proportional torque of the gyro about the precession axis, and means responsive to torque of the gyro to move said control member.

33. In a follow-up control system, a rotary pilot member, a rotary operated member, a motor for driving the operated member, a rotary control member, means responsive to relative rotary movements of the pilot and operated members for rotating the control member, a gyro, a coupling between the control member and the gyro and including abutment surfaces which accommodate movement of the latter about its precession axis and which are engageable frictionally due to gyroscopic action to damp oscillations of the gyro about the precession axis, spring means for centering the gyro with respect to the precession axis, and means responsive to movement of the gyro about the precession axis for controlling said motor.

34. In a follow-up control system, a rotary pilot member, a rotary operated member, a motor for driving the operated member, a rotary control member, means responsive to relative rotary movements of the pilot and operated members for rotating the control member, a yoke having a swivel connection with respect to the control member, the axis of the swivel connection being coincident with that of the control member, a gyro rotor, a frame for the rotor, means for connecting the frame to the yoke with the rotor spin axis extending so as to provide for pivotal movement of the frame and the rotor about a precession axis which is normal both to the rotor spin axis and to the axis of the control member, a torque-transmitting coupling between the control member and the frame and including abutment surfaces which accommodate for movement of the latter and the rotor about the precession axis and which surfaces are engageable frictionally due to gyroscopic action to damp oscillations of the gyro about the precession axis, and means responsive to torque of the rotor and frame about the precession axis for controlling the motor.

35. The combination as claimed in claim 34 wherein the last-named means includes centering springs connecting the yoke and the frame and effective about the precession axis of the latter and of the rotor.

36. In combination, a rotary pilot member, a rotary operated member, a motor for driving the operated member, a rotary control member, stops for limiting the extent of rotary movement of the control member, driving means for the control member including a slip clutch connection with respect thereto, means responsive to relative rotary movements of the pilot and operated members for rotating said driving means, a gyro, a coupling between the control member and the gyro and including abutment surfaces which accommodate for movement of the gyro about the precession axis and which are engageable frictionally due to gyroscopic action to damp oscillations of the gyro about the precession axis, and means responsive to torque of the gyro about the precession axis for controlling the motor.

CLINTON R. HANNA.
STANLEY J. MIKINA.
LAWRENCE B. LYNN.